United States Patent
Chino et al.

(10) Patent No.: US 6,331,010 B1
(45) Date of Patent: *Dec. 18, 2001

(54) STRUCTURE FOR SUPPORTING CYLINDERS

(75) Inventors: Kenji Chino; Yoshihisa Iwanaga, both of Kariya (JP)

(73) Assignee: Kabushiki Kaisha Toyoda Jidoshokki Seisakusho, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/120,418

(22) Filed: Jul. 22, 1998

(30) Foreign Application Priority Data

Jul. 23, 1997 (JP) .................................................. 9-197206

(51) Int. Cl.[7] ..................................................... B60G 7/00
(52) U.S. Cl. ................................. 280/124.112; 280/6.154
(58) Field of Search ................................... 403/122, 123, 403/124, 128, 140, 135, 143, 142, 141; 280/6.154, 6.16, 124.159, 124.16, 6.15, 124.112; 267/64.16, 64.17

(56) References Cited

U.S. PATENT DOCUMENTS

| | | | |
|---|---|---|---|
| 1,941,143 | * 12/1933 | Wickersham | 280/6.154 |
| 2,504,289 | * 4/1950 | Waterman | 280/6.154 |
| 3,176,805 | * 4/1965 | Gandy | 403/122 |
| 3,233,909 | * 2/1966 | Boone | 280/6.154 |
| 3,357,512 | * 12/1967 | Wilson | 280/6.154 |
| 3,510,178 | * 5/1970 | Sowatzke | 403/128 |
| 3,703,298 | * 11/1972 | Laverda | 280/6 H |
| 3,743,044 | * 7/1973 | Scheele | 180/41 |
| 4,031,967 | * 6/1977 | Atherton et al. | 403/143 |
| 4,936,423 | 6/1990 | Karnopp | 188/299 |
| 5,639,119 | * 6/1997 | Plate et al. | 280/6.154 |

FOREIGN PATENT DOCUMENTS

| | | |
|---|---|---|
| 37 25 404 A1 | 3/1989 | (DE) . |
| 0 278 841 A1 | 8/1988 | (EP) . |
| 0 352 181 A1 | 1/1990 | (EP) . |
| 58-183307 | 10/1983 | (JP) . |
| 60-094808 | 5/1985 | (JP) . |
| 1-126416 | * 5/1989 | (JP) ..................................... 403/140 |
| 6-191251 | 7/1994 | (JP) . |

* cited by examiner

Primary Examiner—Paul N. Dickson
Assistant Examiner—Gerald Klebe
(74) Attorney, Agent, or Firm—Woodcock Washburn Kurtz Mackiewicz & Norris LLP

(57) ABSTRACT

An industrial vehicle has a frame and an axle swingalbly connected with the frame, wherein a cylinder interposed between the frame and the axle selectively extends and retracts so as to absorb a swinging motion of the axle. The cylinder is coupled to the frame and the axle in a rotatable manner within a plane intersecting an axis of a center about which the axle swings.

5 Claims, 4 Drawing Sheets

STRUCTURE FOR SUPPORTING CYLINDERS

BACKGROUND OF THE INVENTION

The present invention relates to a structure for supporting cylinders, which are employed in vehicles such as forkifts and arranged between axles and body frames to restrict the movement of the axles.

Forklifts having rear axles that are supported pivotally with respect to its body frame to permit tilting, or roll, of the forklift are known in the prior art (e.g., Japanese Unexamined Patent Publication No. 58-183307). In such a forklift, a hydralic cylinder is arranged between the body frame and the axle to restrict the pivoting of the axle with respect to the body frame. The hydraulic cylinder locks the axle and restricts tilting of the forklift to maintain stability. For example, the tilting of the forklift is restricted when the forklift carries heavy loads, holds loads at high positions, or turns to change directions at high traveling speeds.

The hydraulic cylinder may be connected to the body frame and to the rear axle. In such case, a bracket having a connecting shaft, which extends in the longitudinal direction of the forklift (the direction of the roll axis), is fixed to the body frame. The hydraulic cylinder has a cylindrical housing. One end of the housing is secured to an anchor. The anchor is pivotally connected to the connecting shaft by means of a bearing such that the hydraulic cylinder is pivotal with respect to the body frame about the connecting shaft. A piston rod extending from the other end of the housing is connected to the rear axle such that the piston rod is pivotal. That is, like the housing of the hydraulic cylinder, the piston is pivotal about an axis that extends in the longitudinal direction of the forklift. Accordingly, the hydraulic cylinder is pivoted relative to the body frame and the rear axle, a pair of axes that extend in the direction of the roll axis.

The rear axle is assembled as a unit, or an assembly, before being connected to the body frame. The dimensional tolerances allowed for the components constituting the rear axle assembly may offset the position of the rear axle relative to the body frame from the ideal location in the longitudinal direction of the forklift. Furthermore, parts connecting the rear axle to the body frame may become loose during use of the forklift. This may also offset the relative position of the rear axle and the body frame. Such conditions would apply excessive force on the connecting shaft, the anchor, the bracket, and other parts of the hydraulic cylinder.

These problems may be solved by a structure such as that shown in FIG. 5. In a similar manner to the structure of the Japanese publication, a bracket 70 fixed to a body frame 75 has two support plates 72 to support a connecting shaft 71. A hydraulic cylinder 77 secured to a rear axle 76 is connected to the connecting shaft 71 with a bearing 74. The structure of FIG. 5 differs from the structure of the Japanese publication in that the distance between the support plates 72 is longer and that the connecting shaft 71 is longer than the diameter of the anchor 73. This permits the anchor 73 to move in the axial direction of the connecting shaft 71, or longitudinal direction of the vehicle. Thus, if the position of the rear axle 71 relative to the body frame 75 is offset longitudinally from the ideal location, the movement of the anchor 73 with respect to the connecting shaft 71 compensates for the offset distance. This prevents excessive force from acting on the bracket 70, the anchor 73, and other parts, while permitting the hydraulic cylinder 77 to pivot about a pair of longitudinally extending axes.

In the structure of FIG. 5, the hydraulic cylinder 77 is moved with its anchor 73 connected to the long connecting shaft 71. Thus, when the rear axle 76 is pivoted with respect to the body frame 75, a bending force is applied to the connecting shaft 71 by the anchor 73. The bending force may deform the connecting shaft 71. Therefore, the dimensions of the connecting shaft 71 and the bracket 70 must be enlarged to withstand the bending force. This increases the space required by the bracket 70.

SUMMARY OF THE INVENTION

Accordingly, it is an objective of the present invention to provide a cylinder supporting structure that prevents the application of excessive force on parts used to support the cylinder without enlarging the dimensions of the supporting structure.

To achieve the above objective, the present invention provides an industrial vehicle having a frame and an axle swingably connected with the frame. The vehicle includes a center shaft of the swinging motion of the axle. The center shaft has an axis. The frame is connected with the axle by the center shaft. The axle swings about the center shaft. A cylinder is interposed between the frame and the axle. The cylinder is arranged to selectively extend and retract so as to absorb the swinging motion of the axle. A coupling device couples the cylinder with the frame and the axle. The cylinder is rotatable within a plane intersecting the axis of the central shaft.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A cylinder supporting structure according to the present invention will now be described with reference to FIGS. 1 to 3. The supporting structure is employed in industrial vehicles such as a forklift.

Figure 2:
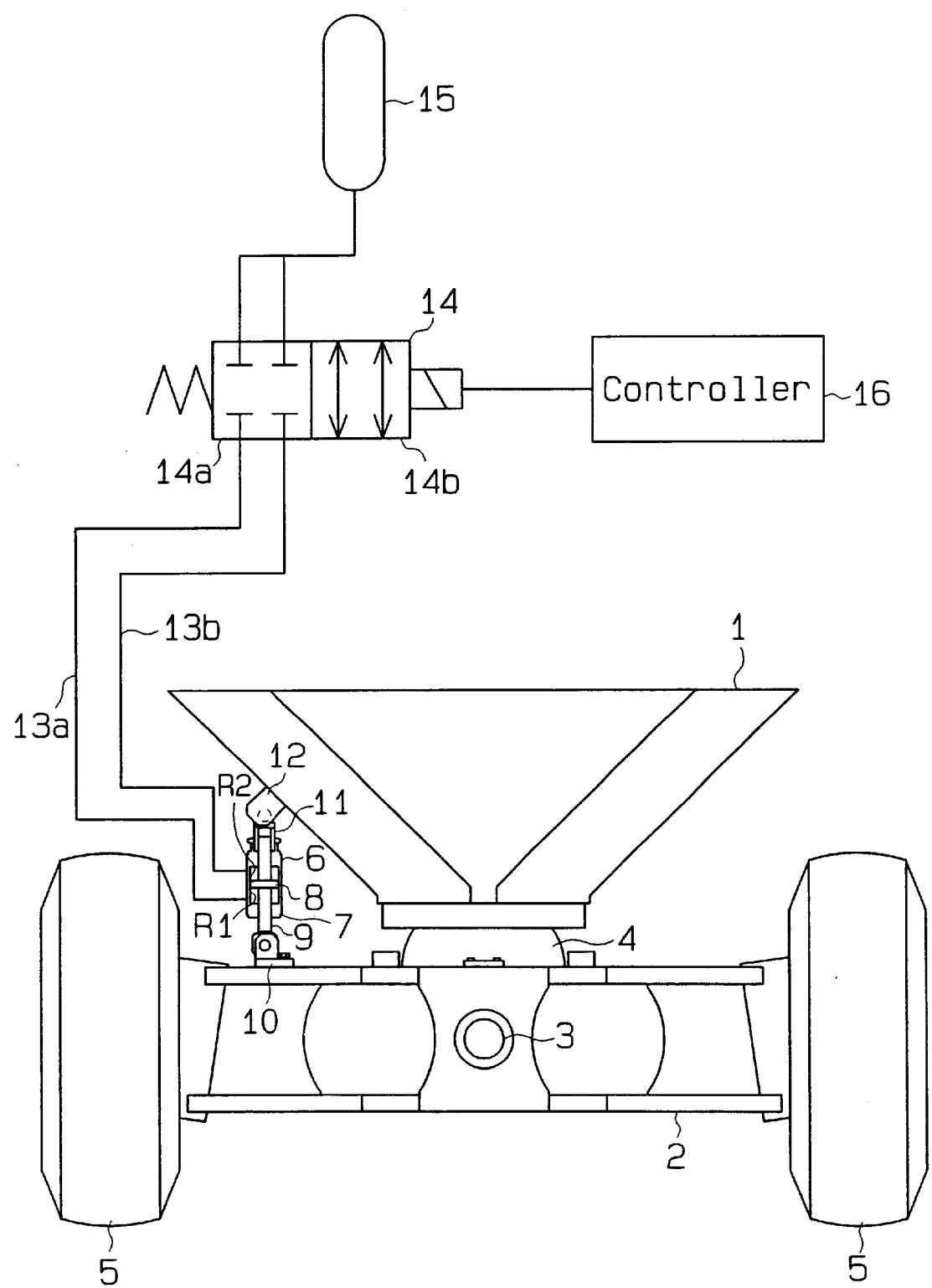
FIG. 2 is a diagrammatic rear view showing the body frame and the rear axle of FIG. 1.

FIG. 2 is a schematic view showing the rear view of a forklift. As shown in the drawing, the forklift has a body frame 1. A rear axle 2 is arranged at the rear lower section of the forklift. The rear axle 2 is supported such that it is pivotal about a center pin 3 in the roll direction of the forklift. In other words, the rear axle 2 moves relatively to the body frame 1 in a plane extending normal to the longitudinal axis of the vehicle. An elastic member 4 for dampening the impact produced by the pivoting of the rear axle 2 is provided between the body frame 1 and the rear axle 2. Wheels 5, which are steered to change the direction of the forklift, are mounted on each end of the rear axle 2.

A multiple action type hydraulic cylinder 6 is arranged between the body frame 1 and the rear axle 2. As shown in FIG. 3, the cylinder 6 includes a housing 7, which accommodates a piston 8. The piston 8 defines a lower chamber Ri and an upper chamber R2 in the housing 7. A piston rod 9 is fixed to the piston 8. As shown in FIG. 1, the piston rod 9 is connected to a bracket 10, which is fixed to the rear axle 2. An end piece 11 is provided at the upper end of the housing 7. The end piece 11 is connected to a bracket 12, which is fixed to the body frame 1.

As shown in FIG. 2, the lower chamber R1 is connected to an electromagnetic control valve 14 through a passage 13a, while the upper chamber R2 is connected to the control valve 14 through a passage 13b. The control valve 14 is further connected to an accumulator 15. The control valve 14 is normally closed. Therefore, when the control valve 14 is de-excited, the control valve 14 is shifted to a disconnected position 14a. At the disconnected position 14a, movement of hydraulic oil between the lower and upper chambers R1, R2 is prohibited. The control valve 14 is shifted to a connected position 14b when excited. At the connected position 14b, hydraulic oil is permitted to move between the lower and upper chambers R1, R2.

A controller 16 is electrically connected to the control valve 14. When the forklift engine (not shown) is running, the controller 16 continuously excites the control valve 14. However, if certain conditions are satisfied, the controller 16 de-excites the control valve 14.

Figure 1:
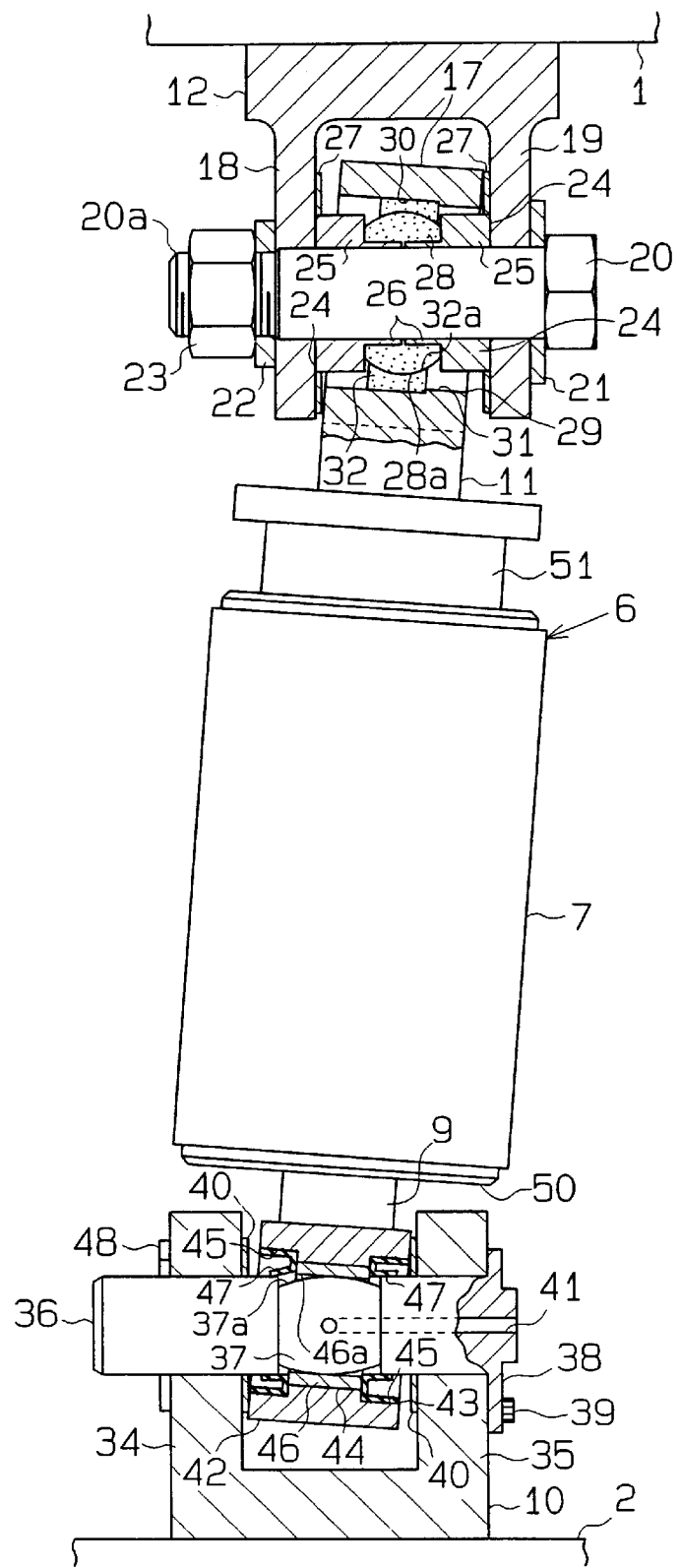
FIG. 1 is a schematic side view, partially in cross-section, showing a cylinder supporting structure according to the present invention, as seen in a direction normal to the longitudinal direction of the vehicle.

As shown in FIG. 1, the bracket 12 fixed to the body frame 1 has two support plates 18, 19. An upper connecting shaft 20 extending parallel to the longitudinal axis (the roll axis) of the forklift is supported by the two support plates 18, 19. A threaded portion 20a is defined on one end of the connecting shaft 20. A nut 23 is engaged with the threaded portion 20a to fasten the connecting shaft 20 to the bracket 12. A washer 22 is held between the support plate 18 and the nut 23. Another washer 21 is held between the support plate 19 and the connecting shaft 20.

Two identical collars 24 are fitted to the connecting shaft 20 between the support plates 18, 19. Each collar 24 has a large diameter portion 25 and a small diameter portion 26. Each large diameter portion 25 is located on the outer side of the collar 24 adjacent to the associated support plate 18, 19. A spacer 27 is fitted on each large diameter portion 25. Each spacer 27 contacts the inner wall of the associated support plate 18, 19.

A male bushing 28 is fitted on the small diameter portions 26 of the two collars 24. That is, the male bushing 28 is held between the large diameter portion 25 of the collars 24 and between the support plates 18, 19. The male bushing 28 has a convex surface 28a and is made of a sintered metal, in which lubricating oil is impregnated.

An upper anchor 17 is defined at the upper portion of the end piece 11. The upper anchor 17 has a bore 29 through which the connecting shaft 20 is inserted. A large diameter portion 30 and a small diameter portion 31 are defined in the support bore 29. A female bushing 32 is fitted in the large diameter portion 30 and abuts against the wall, or step, formed between the large and small diameter portions 30, 31. The abutment of the female bushing 32 against the wall determines the position of the female bushing 32. In the same manner as the male bushing 28, the female bushing 32 is made of a sintered metal, in which lubricating oil is impregnated, and has a concave surface 32a. The concave surface 32a slides against the convex surface 28a of the male bushing 28.

The end piece 11 is connected to the connecting shaft 20 by engaging the male bushing 28 with the female bushing 32 such that the convex surface 28a comes into spherical surface contact with the concave surface 32a. The engagement between the male and female bushings 28, 32 permits the upper anchor 17 to pivot relative to the connecting shaft 20 when the end piece 11 and the bracket 12 are connected to each other. In other words, the angle defined between the axis of the bore 29 and the axis of the connecting shaft 20 can be changed arbitrarily in accordance with the pivoting of the hydraulic cylinder 6. The male and female bushings 28, 32 are commercially available and sold in sets. Furthermore, the male and female bushings 28, 32 define a universal joint.

The bracket 10 fixed to the rear axle 2 also has two support plates 34, 35. A lower connecting shaft 36 extending parallel to the longitudinal axis of the forklift is supported by the support plates 34, 35. A bearing portion 37 is defined at the axially middle part of the connecting shaft 36. The bearing portion 37 has a curved surface 37a. A flange 38 extends radially and integrally from one end of the connecting shaft 36. A bolt 39 fastens the connecting shaft 36 to the bracket 10 with the flange 38 engaged with the support plate 35. The other end of the connecting shaft 36 projects from the support plate 34. A cotter pin 48 is inserted radially through the connecting shaft 36 to keep the connecting shaft 36 held in the bracket 10.

A spacer 40 is fitted on the connecting shaft 36 at each side of the bearing portion 37. Each spacer 40 contacts the inner wall of the associated support plate 34, 35. An oil conduit 41 extends through the connecting shaft 36 from its flanged end to the curved surface 37a of the bearing portion 37. An oil supplying device (not shown) delivers lubricating oil to the oil conduit 41.

A lower anchor 42 is defined on the end of the piston rod 9 projecting from the cylinder housing 7. The lower anchor 42 includes a bore 43 through which the connecting shaft 36 is inserted. A small diameter portion 44 is defined at the axially middle section of the bore 43, while a large diameter portion 45 is defined at each end of the bore 43. A bearing sleeve 46 is fitted into the small diameter portion 44. The inner wall of the bearing sleeve 46 defines a slide surface 46a.

The lower anchor 42 is connected to the connecting shaft 36 by engaging the bearing portion 37 with the bearing sleeve 46 such that the curved surface 37a slides against the slide surface 46a. The engagement between the bearing portion 37 and the bearing sleeve 46 permits the lower anchor 42 to pivot relative to the lower connecting shaft 36. In other words, the angle defined between the axis of the bore 43 and the axis of the lower connecting shaft 36 can be changed arbitrarily in accordance with the pivoting of the hydraulic cylinder 6. A seal 47 is arranged in each large diameter portion 45 to seal the space formed between the curved surface 37a and the slide surface 46a. The seal 47 may be made of synthetic rubber. The connecting shaft 36 and the bearing sleeve 46 define a universal joint.

Accordingly, the hydraulic cylinder 6 is supported between the body frame 1 and the rear axle 2 by two universal joints such that the cylinder 6 is pivotal about each joint in a plane that intersects the roll axis of the vehicle.

Figure 3:
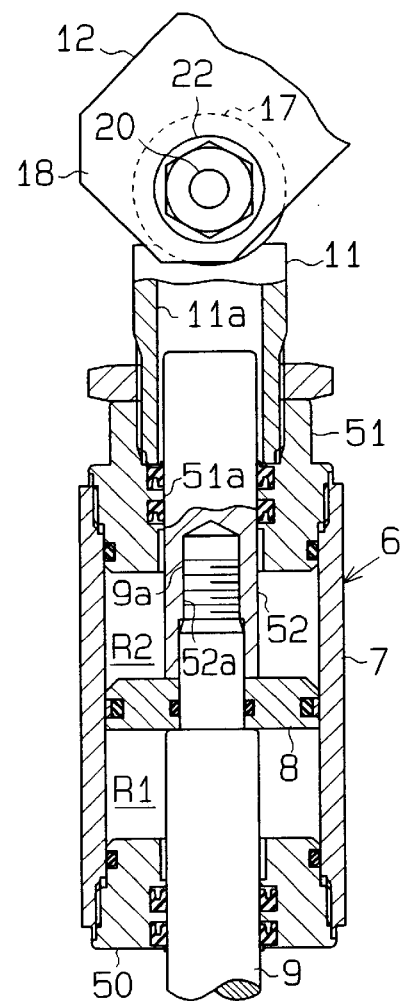
FIG. 3 is a rear view, partially in cross-section, showing the hydraulic cylinder of FIG. 1, as seen in the direction of the longitudinal axis of the vehicle.

As shown in FIG. 3, the housing 7 of the hydraulic cylinder 6 has a lower opening closed by a rod piece 50 and a higher opening closed by a head piece 51.

A guide rod 52 is fixed to the upper end of the piston 8 in the housing 7, as viewed in FIG. 3. The cross-sectional area of the guide rod 52 is equal to that of the piston rod 9. The piston rod 9 has an upper end that extends through the piston 8 and into the upper chamber R2. A threaded section 9a is defined on this end. The other end of the piston rod 9 extends through the rod piece 50 and out of the housing 7. The guide rod 52 has a lower end located in the upper chamber R2. A threaded bore 52a is defined in this end. The threaded bore 52a is fastened to the threaded section 9a of the piston rod 9. Accordingly, the piston rod 9 and the guide rod 52 are fastened to each other with the piston 8 held in between. In the hydraulic cylinder 6, the pressure-receiving area of the upper end of the piston 8 is equal to that of the lower end of the piston 8. In other words, their axially projected areas are the same. Also, the cross-sectional areas of the chambers R1, R2 are the same.

The head piece 51 has a support bore 51a to slidably accommodate the upper end of the guide rod 52. The end piece 11 has a retaining bore 11a for retaining the upper end of the guide rod 52. The guide rod 52 moves axially in the retaining bore 11a.

When assembling the rear axle 2 to the body frame 1, the machining tolerances allowed for each component and the assembling tolerances allowed for the assembled components may offset the position of the rear axle 2 relative to the body frame 1 from the desirable position in the longitudinal direction of the forklift, or in a direction parallel to the roll axis. In such case, if the hydraulic cylinder 6 is connected to the bracket 12 of the body frame 1 and to the bracket 10 of the rear axle 2, the hydraulic cylinder 6 will be tilted in a vertical plane that is parallel to the roll axis as shown in FIG. 1. That is, the upper and lower ends of the hydraulic cylinder 6 will be pivoted about horizontal axes that are normal to the roll axis. Furthermore, if the position of the rear axle 2 relative to the body frame 1 is offset from the ideal position in the lateral direction of the forklift, the hydraulic cylinder can also be tilted in a vertical plane, that is normal to the roll axis.

In there is lateral offset and if the rear axle 2 is pivoted relative to the body frame 1, the lower anchor 42 pivots about the connecting shaft 36 as the slide surface 46a of the bearing sleeve 46 slides against the curved surface 37a of the bearing portion 37 while the axis of the bore 43 pivots relative to the axis of the connecting shaft 36. Simultaneously, the end piece 11 is pivoted about the connecting shaft 20 as the convex surface 28a of the male bushing 28 slides against the concave surface 32a of the female bushing 32 while the axis of the bore 29 pivots relative to the axis of the connecting shaft 20.

Accordingly, the pivoting of the rear axle 2 relative to the body frame 1 permits the brackets 10, 12 to pivot in two parallel planes, respectively, that are each perpendicular to the roll axis if the brackets 10, 12 are offset from each other in the direction parallel of the rolling axis. The piston rod 9 is projected from or retracted into the hydraulic cylinder 6 in accordance with the pivoting of the rear axle 2 relative to the body frame 1.

Since the pressure-receiving area of the upper end of the piston 8 is equal to that of the lower end of the piston 8, and the cross-sectional area of the upper chamber R2 is the same as that of the lower chamber R1, the amount of hydraulic oil discharged from one of the chambers R1 R2 is equal to that sent into the other chamber R1, R2 during actuation of the hydraulic cylinder 6. Therefore, the piston 8 moves in the same manner whether the piston rod 9 projects out of or retracts into the hydraulic cylinder 6. This permits smooth pivoting of the rear axle 2 relative to the body frame 1.

When the controller 16 de-excites the electromagnetic control valve 14, the control valve 14 is shifted from the connected position 14b to the disconnected position 14a. This prohibits the movement of hydraulic oil between the lower and upper chambers R1, R2 in the hydraulic cylinder 6 and locks the hydraulic cylinder 6. Accordingly, the hydraulic cylinder 6 prohibits pivoting of the rear axle 2 relative to the body frame 1.

The preferred and illustrated embodiment of the cylinder supporting structure has the advantages described below.

(a) The rear axle 2 is pivotal relative to the body frame 1 in the roll direction of the forklift. The universal joints (the joints defined by the bushings 28, 32 and by the connecting shaft 36 and the bearing sleeve 46) further support the hydraulic cylinder 6 such that the cylinder 6 is permitted to pivot in a vertical plane intersecting the rolling axis. Accordingly, if the positions of the joint between the cylinder 6 and the body frame 1 and the joint between the cylinder 6 and the rear axle 2 are offset from the ideal location in the longitudinal direction of the forklift, the rear axle 2 is pivoted relative to the body frame 1 while the cylinder 6 pivoted in a plane that is parallel to the rolling axis. This structure prevents the application of excessive force to the brackets 10, 12, the anchors 17, 42, and other parts.

Figure 5:
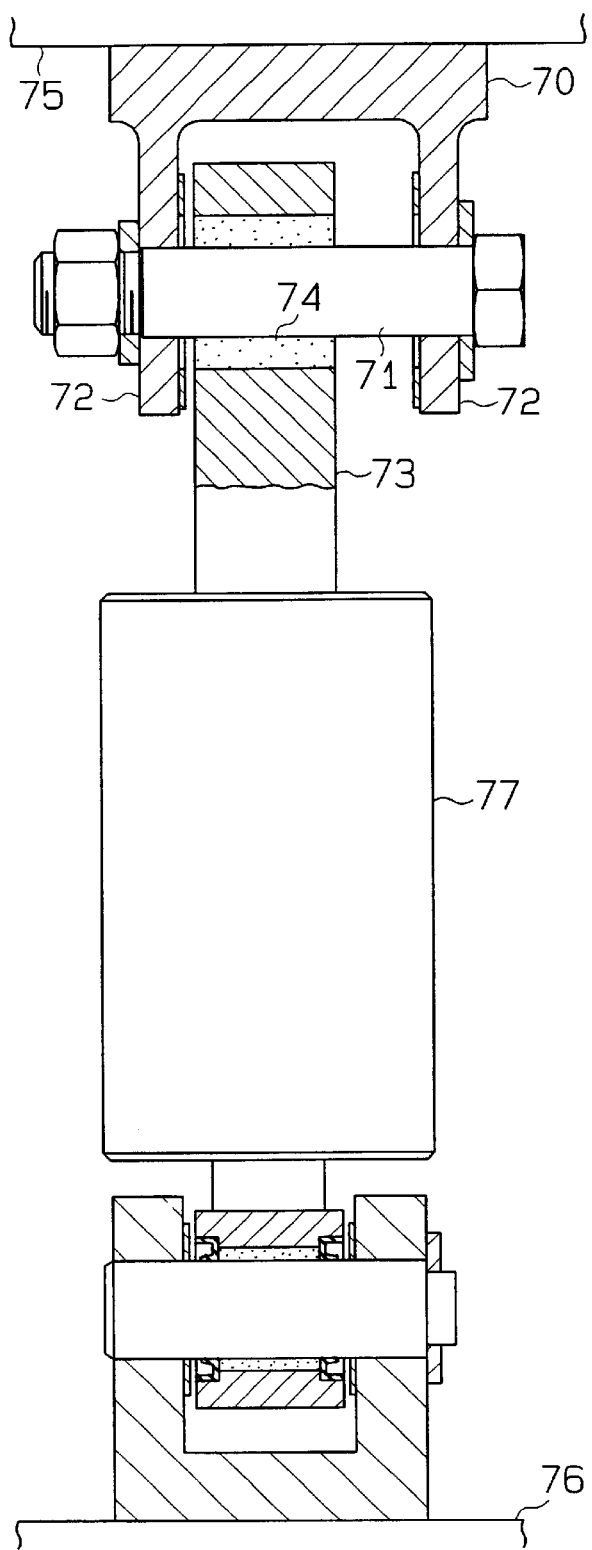
FIG. 5 is a schematic side view, partially in cross-section, showing a prior art cylinder supporting structure, as seen in a direction normal to the longitudinal direction of the vehicle.

Furthermore, a mechanism for connecting the brackets 10, 12 with the associated anchors 17, 42 of the hydraulic cylinder 6 to permit relative movement therebetween in the longitudinal direction of the vehicle, like the vehicle of FIG. 5, becomes unnecessary. Thus, the brackets 10, 12 need not be enlarged to support such connecting mechanisms.

(b) The connecting shaft 20, which extends in the longitudinal direction of the forklift, is supported by the body frame bracket 12 with the male bushing 28 fitted on the connecting shaft 20. The female bushing 32 is fitted into the bore 29 of the upper anchor 17 such that the concave surface 32a of the female bushing 32 engages the convex surface 28a of the male bushing 28. Thus, the upper anchor 17 of the hydraulic cylinder 6 is connected to the connecting shaft 20 of the bracket 12 such that the axis of the bore 29 is permitted to pivot to an arbitrary angle relative to the axis of the connecting shaft 20. In this state, the bushings 28, 32 are in spherical surface contact with each other. Accordingly, the force produced when the rear axle 2 pivots relative to the body frame 1 is applied to the hydraulic cylinder 6 over a wide area. This enhances the durability of the bushings 28, 32. Furthermore, the bushings 28, 32 are easily obtained since they are commercially available.

(c) The connecting shaft 36, which extends in the longitudinal direction of the forklift, is supported by the rear axle bracket 10. The lower anchor 42 of the hydraulic cylinder 6 is connected to the connecting shaft 36 with the cylindrical slide surface 46a of the bearing sleeve 46 engaged with the curved surface 37a defined on the bearing portion 37 of the connecting shaft 36. Thus, the lower. anchor 42 is connected to the bracket 10 such that the axis of the bearing sleeve 46 is permitted to pivot to an arbitrary angle relative to the axis of the connecting shaft 36. Accordingly, production costs are saved by supporting the hydraulic cylinder 6 with the connecting shaft 36 and the bearing sleeve 46.

(d) In the hydraulic cylinder 6, the pressure-receiving area of the upper end of the piston 8 is equal to that of the lower end of the piston 8. Also, the cross-sectional area of the upper chamber R2 is the same as that of the lower chamber R1. Accordingly, the amount of hydraulic oil discharged from one of the chambers R1, R2 is equal to that sent into the other chamber R1, R2 during actuation of the hydraulic cylinder 6. Therefore, the hydraulic cylinder 6 operates smoothly and allows smooth pivoting of the rear axle 2.

(e) The preferred embodiment according to the present invention is applied to the hydraulic cylinder 6 employed in a forklift that restricts the pivoting of the rear axle 2 relative to the body frame 1. This structure prevents excessive force from being applied to the brackets 10, 12, the anchors 17, 42, and other parts. Furthermore, this cylinder supporting structure compensates for the offset distance of the rear axle 2 with respect to the body frame 1 in either the longitudinal or the lateral direction of the vehicle.

It should be apparent to those skilled in the art that the present invention may be embodied in many other specific forms without departing from the spirit or scope of the invention.

In the preferred and illustrated embodiment, the present invention is applied to a vehicle having only one cylinder for restricting the movement of the axle. However, there are vehicles that require two cylinders to restrict the movement of the axle. In such vehicles, the present invention may be applied to each cylinder.

The male bushing 28 having the convex surface 28a and the female bushing 32 having the concave surface 32a may be employed to connect the hydraulic cylinder 6 to the rear axle 2. On the other hand, the connecting shaft 36 and the bearing sleeve 46 may be employed to connect the hydraulic cylinder 6 to the body frame 1. In other words, the hydraulic cylinder may be inverted from the position illustrated.

The connecting shafts 20, 36 need not extend parallel to the longitudinal axis of the vehicle. For example, the connecting shafts 20, 36 may be inclined with respect to the longitudinal axis. This would also prevent the application of excessive force on parts used to support the cylinder 6, while compensating for the offset distance of the rear axle 2 relative to the body frame 1 without increasing the amount of occupied space.

The male and female bushings 28, 32 need not be made of sintered metal. For example, the bushings 28, 32 may be made of a synthetic resin that has a self-lubricating property and superior wear resistance property.

An oil conduit may be formed extending through the connecting shaft 20 and the collars 24 to supply lubricating oil to the convex and concave surfaces 28a, 32a of the bushings 28, 32.

The electromagnetic control valve 14 may be normally opened.

Figure 4:
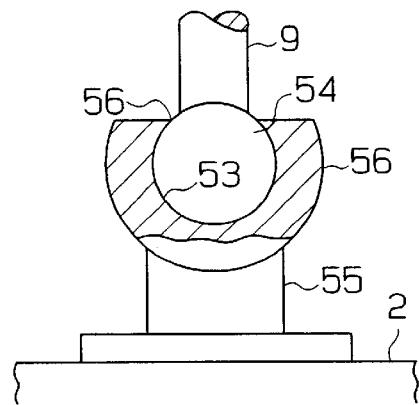
FIG. 4 is a schematic rear view, partially in cross-section, showing a further embodiment of a cylinder supporting structure according to the present invention.

As shown in FIG. 4, the hydraulic cylinder 6 may be connected to the body frame 1 or the rear axle 2 by employing a ball joint 55 having a spherical socket 53 and a joint 56 having a spherical surface 54. The engagement of the spherical cavity 53 with the spherical surface 54 would permit the hydraulic cylinder to pivot in any direction.

The application of the present invention is not limited to forklifts. For example, the present invention may be applied to other types of industrial vehicles such as shovel loaders.

In addition to the hydraulic cylinder 6, the present invention may be applied to other cylinders that dampen impacts.

The present invention may be applied to other types of cylinders used in industrial vehicles. For example, the present invention may be applied to suspending cylinders, vertical motion dampening cylinders, and vertical motion restricting cylinders.

The present invention may also be applied to cylinders operated by liquid pressure and gas pressure (e.g., pneumatic pressure) instead of hydraulic pressure.

The application of the present invention is not limited to industrial vehicles. For example, the present invention may also be applied to any type of industrial machinery that employs cylinders connected to two members that move relatively to each other.

Therefore, the present examples and embodiments are to be considered as illustrative and not restrictive, and the invention is not to be limited to the details given herein, but may be modified within the scope and equivalence of the appended claims.

What is claimed is:

1. An industrial vehicle having a frame and an axle pivotally connected with the frame, said vehicle comprising:

a center shaft about which the axle pivots, said center shaft having an axis, wherein said frame is connected with the axle by the center;

a first bracket fixed to the frame;

a second bracket fixed to the axle;

a cylinder located between the frame and the axle, said cylinder being arranged to selectively extend and retract to absorb the pivotal motion of the axle and being pivotable about axes that are normal to the axis of the center shaft, said cylinder having (i) a first end pivotally coupled to the first bracket and including a first through hole having an inner surface; (ii) a second end pivotally coupled to the second bracket; (iii) a cylinder case; (iv) a piston located in the case; (v) a first piston rod connected with the piston and slidably connected to the first end; (vi) a second piston rod connected with the second end; and (vii) two hydraulic chambers selectively receiving and discharging hydraulic fluid to extend and retract the cylinder, respectively, wherein the piston is located between the two hydraulic chambers, and the piston has a first pressure-receiving area that faces one of the two hydraulic chambers and a second pressure-receiving area that faces the other of the two hydraulic chambers, and wherein the first pressure-receiving area is substantially equal in size to the second pressure-receiving area; and joints that couple the cylinder with the frame and the axle, said joints including:

a first coupler for coupling the first end to the first bracket, said first coupler including: (i) a first support shaft supported by the first bracket, wherein the first support shaft extends through the first through hole; (ii) a collar mounted on the first support shaft, wherein the collar includes a pair of large diameter portions and a small diameter portion located between the large diameter portions; (iii) a convex portion provided with the small diameter portion; and (iv) a concave portion provided with the inner peripheral surface of the first through hole, wherein said concave portion engages and slides with respect to the convex portion; and a second coupler for coupling the second end to the second bracket.

2. The industrial vehicle as set forth in claim 1, further comprising:

said second end including a second through hole, said second through hole having an inner peripheral surface; and said second coupling means including:
the second support shaft supported by the second bracket and extending through the second through hole;
a spherical portion provided with the second support shaft; and
a contacting surface provided with the inner peripheral surface of the second through hole, said contacting surface engaging the spherical portion.

3. An industrial vehicle having a frame and an axle pivotally connected with the frame, said vehicle comprising:
a center shaft about which the axle pivots, said center shaft having an axis, wherein said frame is connected with the axle by the center shaft;
a first bracket fixed to the frame;
a second bracket fixed to the axle;
a cylinder located between the frame and the axle and being pivotable about axes that are normal to the axis of the center shaft, said cylinder having (i) a first end in association with the first bracket and including a first through hole having an inner peripheral surface; (ii) a second end in association with the second bracket; (iii) a cylinder case; (iv) a piston located in the case; (v) a first piston rod connected with the piston and slidably connected to the first end; (vi) second piston rod connected with the second end; (vi) a second piston rod connected with the second end; and (vii) two hydraulic chambers selectively receiving and discharging hydraulic fluid to extend and retract the cylinder, respectively, wherein the piston is located between the two hydraulic chambers, and the piston has a first pressure-receiving area that faces one of the two hydraulic chambers and a second pressure-receiving area that faces the other of the two hydraulic chambers, and wherein the first pressure-receiving area is substantially equal in size to the second pressure-receiving area;
a first joint coupling the first end to the first bracket, said first joint including:
a first support shaft supported by the first bracket and extending through the first through hole;
a collar mounted on the first support shaft, said collar having a pair of large diameter portions and a small diameter portion disposed between the large diameter portions;
a convex portion provided with the small diameter portion; and
a concave portion provided with the inner peripheral surface of the first through hole, said concave portion slidably engaging the convex portion; and
a second joint coupling the second end to the second bracket.

4. The industrial vehicle as set forth in claim 3, further comprising:
said second end including a second through hole, said second through hole having an inner peripheral surface; and
said second joint including:
the second support shaft supported by the second bracket and extending through the second through hole;
a spherical portion provided with the second support shaft;
a contacting surface provided with the inner peripheral surface of the second through hole, said contacting surface engaging the spherical portion.

5. The industrial vehicle as set forth in claim 4, wherein said cylinder is actuated by hydraulic force.

* * * * *

UNITED STATES PATENT AND TRADEMARK OFFICE
CERTIFICATE OF CORRECTION

PATENT NO. : 6,331,010 B1
DATED : December 18, 2001
INVENTOR(S) : Chino et al.

It is certified that error appears in the above-identified patent and that said Letters Patent is hereby corrected as shown below:

Column 9,
Lines 30-31, after "second end;", delete "(vi) a second piston rod connected with the second end;" (second occurrence).

Signed and Sealed this

Twenty-third Day of April, 2002

*Attest:*

JAMES E. ROGAN
*Director of the United States Patent and Trademark Office*

*Attesting Officer*